US008588424B2

(12) United States Patent
Yamada et al.

(10) Patent No.: US 8,588,424 B2
(45) Date of Patent: Nov. 19, 2013

(54) COMMUNICATION APPARATUS AND COMMUNICATION METHOD

(75) Inventors: Kenji Yamada, Kawasaki (JP);
Tadashige Iwao, Kawasaki (JP);
Hidefumi Takaoka, Fukuoka (JP);
Syunsuke Koga, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 245 days.

(21) Appl. No.: 13/075,332

(22) Filed: Mar. 30, 2011

(65) Prior Publication Data
US 2011/0176681 A1 Jul. 21, 2011

Related U.S. Application Data

(63) Continuation of application No. PCT/JP2009/062471, filed on Jul. 8, 2009.

(30) Foreign Application Priority Data

Oct. 17, 2008 (JP) ................. 2008-268829

(51) Int. Cl.
*H04L 29/06* (2006.01)

(52) U.S. Cl.
USPC .......................... 380/281; 380/278

(58) Field of Classification Search
USPC ......... 380/278, 279, 280, 281, 282, 283, 284, 380/285, 286
See application file for complete search history.

(56) References Cited

U.S. PATENT DOCUMENTS

| 6,711,264 | B1* | 3/2004 | Matsumoto et al. | 380/283 |
| 2004/0083393 | A1* | 4/2004 | Jordan et al. | 713/202 |
| 2007/0143600 | A1* | 6/2007 | Kellil et al. | 713/163 |
| 2007/0174901 | A1* | 7/2007 | Chang et al. | 726/5 |

FOREIGN PATENT DOCUMENTS

| JP | 2004-56762 | | 2/2004 | |
| JP | 2007-267301 | | 10/2007 | |
| WO | WO 2005086412 | A1 * | 9/2005 | ............... H04L 9/32 |
| WO | 2008/096396 | | 8/2008 | |

OTHER PUBLICATIONS

International Search Report dated Sep. 8, 2009, from the corresponding International Application.
Written Opinion of the International Searching Authority dated Sep. 8, 2009, from the corresponding International Application.
Kazuki Ohtsu, et al. "An Implementing Evaluation of an Efficient Key Management Method in a P2P File Sharing System" Transactions of Information Processing Society of Japan, vol. 47, No. 8, IPSJ Journal, Aug. 15, 2006, pp. 2464 to 2476.
Akira Watanabe, et al. "Proposal of a Secure Key Distribution Method and its Management Method for Construction of Closed Communication Groups in Intra-Networks" The Transactions of the Institute of Electrical Engineers of Japan, vol. 121-C, No. 9, Sep. 1, 2001, pp. 1429-1438.

* cited by examiner

*Primary Examiner* — Eleni Shiferaw
*Assistant Examiner* — Hilary Branske
(74) *Attorney, Agent, or Firm* — Katten Muchin Rosenman LLP

(57) ABSTRACT

A communication apparatus includes an encryption key generation unit that generates encryption key information at constant encryption key generation intervals, a common key generation unit that generates common key information uniquely with respect to a generation time at common key generation intervals set longer than the encryption key generation intervals, a common key application unit that performs encryption or decryption of the encryption key information by using the common key information, and an encryption key distribution unit that makes a request to a data transmitting/receiving unit to distribute the encryption key information to a plurality of communication apparatuses to be communicated simultaneously at encryption key distribution intervals set shorter than the encryption key generation intervals to perform communication with higher security.

15 Claims, 10 Drawing Sheets

FIG.2

(a) ENCRYPTION KEY INFORMATION

| OLD KEY | CURRENT KEY | NEXT UPDATE KEY |
|---|---|---|

(b) COMMON KEY INFORMATION

| OLD COMMON KEY | CURRENT COMMON KEY | NEXT UPDATE COMMON KEY |
|---|---|---|

(c) REMOTE PARTY KEY INFORMATION

| REMOTE PARTY NUMBER | REMOTE PARTY KEY |
|---|---|

(d) DATA TRANSITION

| USE \ PATTERN | PATTERN 1 | PATTERN 2 | PATTERN 3 |
|---|---|---|---|
| OLD KEY | KEY n | KEY n+1 | KEY n+2 |
| CURRENT KEY | KEY n+1 | KEY n+2 | KEY n+3 |
| NEXT UPDATE KEY | KEY n+2 | KEY n+3 | KEY n+4 |

...

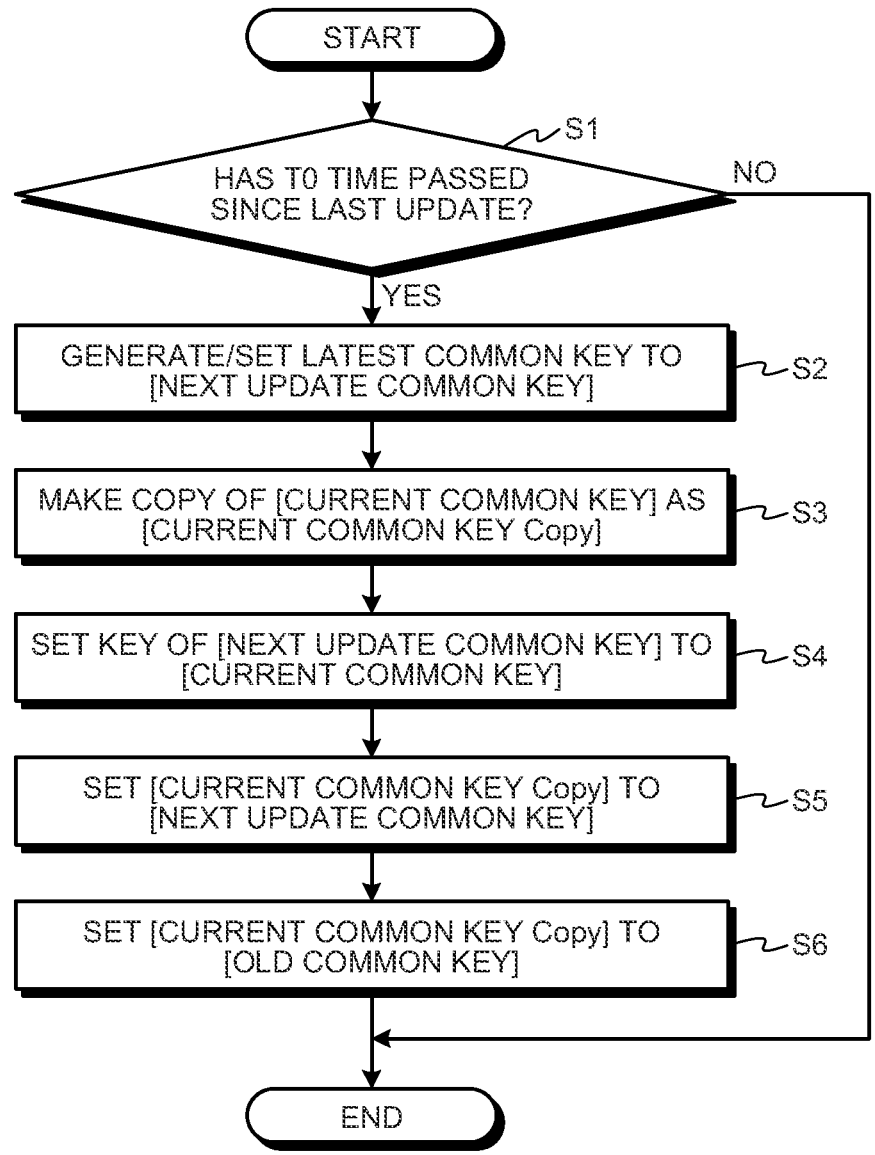

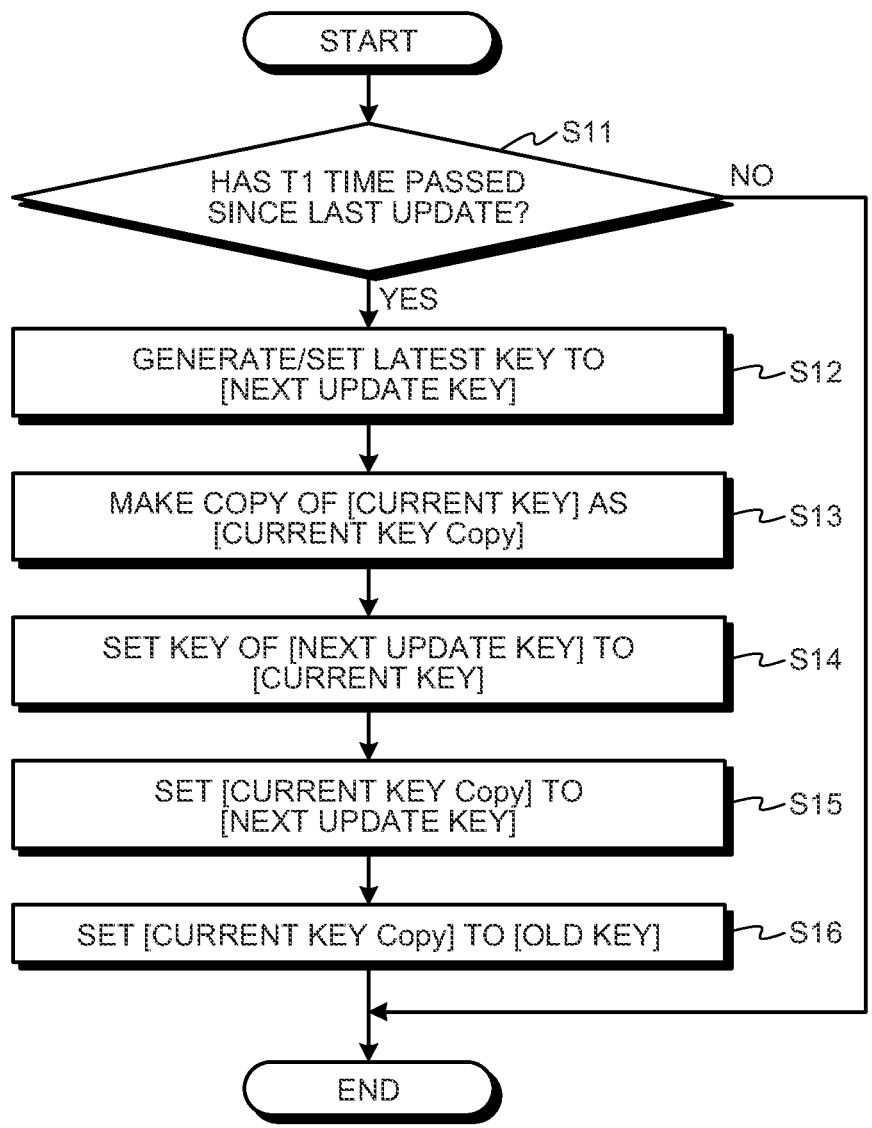

COMMUNICATION APPARATUS AND COMMUNICATION METHOD

CROSS-REFERENCE TO RELATED APPLICATION

This application is a continuation of International Application No. PCT/2009/062471, filed on Jul. 8, 2009 which claims the benefit of priority from Japanese Patent Application No. 2008-268829, filed on Oct. 17, 2008, the entire contents of which are incorporated herein by reference.

FIELD

The embodiments discussed herein are directed to a communication apparatus including a security function using an encryption key, and a communication method.

BACKGROUND

A communication apparatus generally performs encryption communication, updates an encryption key used for the encryption communication periodically, and notifies other communication nodes of the encryption key periodically to ensure communication security. However, if communication parties cannot be successfully notified of the encryption key notified periodically for some reason or a temporal shift in update timing of the encryption key arises between communication nodes, the communication apparatus may receive encrypted data encrypted by using an old encryption key before the update from communication parties. In such a case, there is a problem that the communication apparatus is temporarily disabled to perform communication due to a mismatch of the encryption keys between communication apparatus nodes that transmit/receive encrypted data.

To solve the problem, a conventional communication apparatus includes a new key memory that holds a newly distributed encryption key as a new key, an old key memory that holds an encryption key distributed last time as an old key, and a switching unit that switches to encryption communication by the old key held in the old key memory after unsuccessful encryption communication by the new key (see, for example, Japanese Laid-open Patent Publication No. 2007-267301).

The conventional communication apparatus encrypts an encryption key by using a common key shared by each communication node in common and distributes the encrypted encryption key to other communication nodes, but the common key is fixed and if the common key should be deciphered, the encryption key is deciphered, even if the encryption key is updated, after each update and the conventional communication has a subject of causing grave flaws of security.

SUMMARY

According to an aspect of an embodiment of the invention, a communication apparatus includes a data transmitting/receiving unit that transmits data to and receives data from another communication apparatus; a plain text data processing unit that edits plain text data; an encryption key generation unit that generates encryption key information at constant encryption key generation intervals; a common key generation unit that generates common key information to perform encryption or decryption on the encryption key information generated by the encryption key generation unit uniquely with respect to a generation time as the common key information common among communication apparatuses at common key generation intervals set longer than the encryption key generation intervals; a common key application unit that performs the encryption of the encryption key information generated by the encryption key generation unit or the decryption of the encryption key information received from another communication apparatus using the common key information generated by the common key generation unit; and an encryption key distribution unit that makes a request to the data transmitting/receiving unit to distribute the encryption key information encrypted by the common key application unit to all communication apparatuses to be communicated at encryption key distribution intervals set shorter than the encryption key generation intervals.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a diagram illustrating data layout examples and a data transition example of the communication apparatus according to the first embodiment of the present invention;

FIG. 4A is a flowchart to generate encryption key information and common key information of the communication apparatus according to the first embodiment of the present invention;

FIG. 4B is a flowchart to generate encryption key information and common key information of the communication apparatus according to the first embodiment of the present invention;

DESCRIPTION OF EMBODIMENTS

Preferred embodiments of the present invention will be explained with reference to accompanying drawings.

[a] First Embodiment

Figure 1:
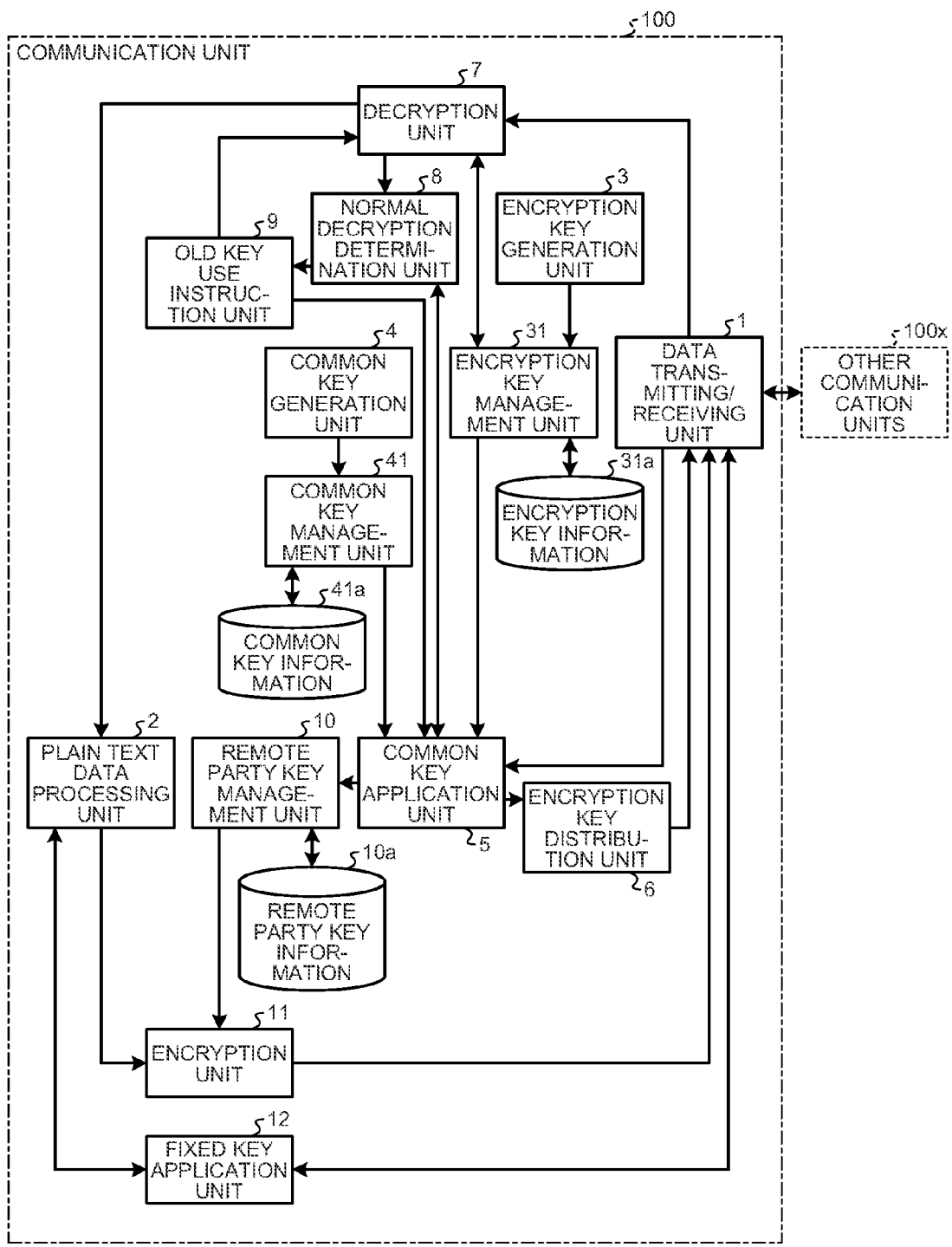
FIG. 1 is a block diagram illustrating the configuration of a communication apparatus according to a first embodiment of the present invention.
Figure 3:
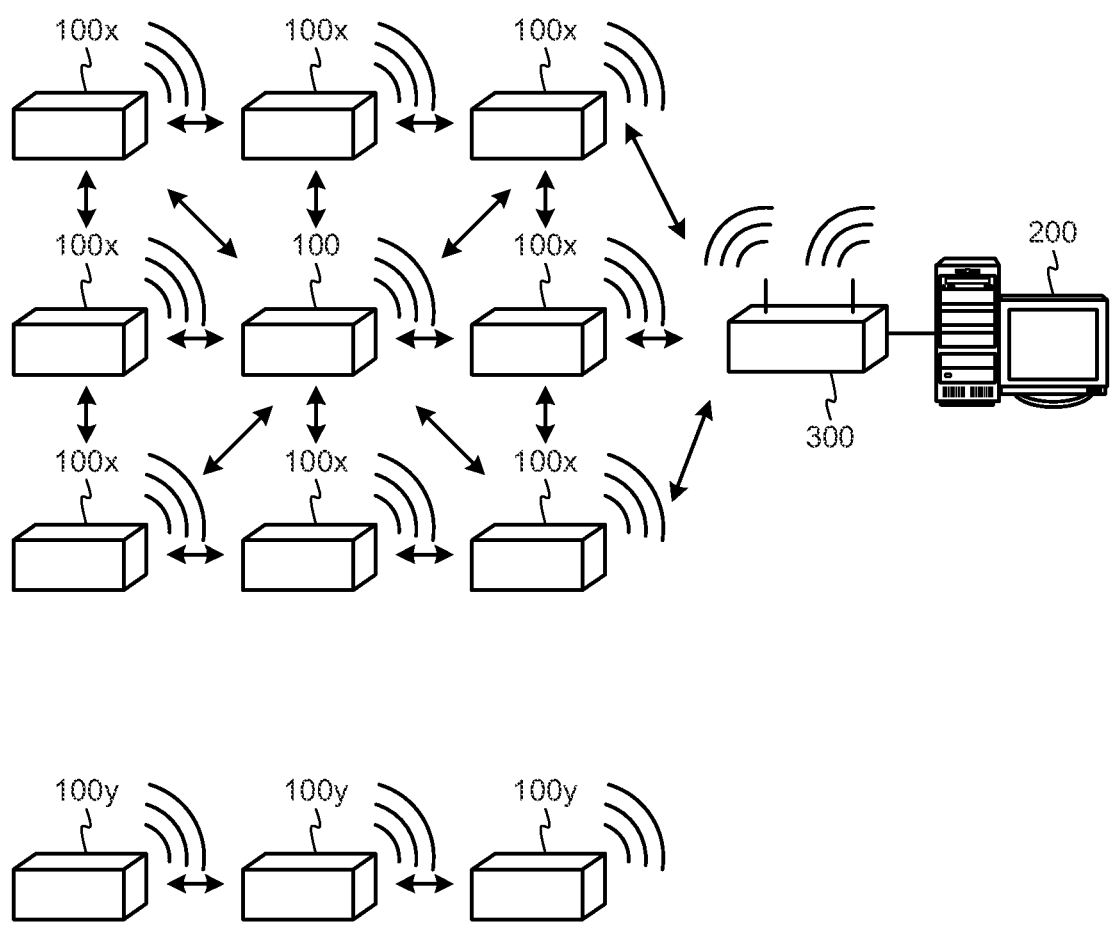
FIG. 3 is a network block diagram of the communication apparatus according to the first embodiment of the present invention.
Figure 5:
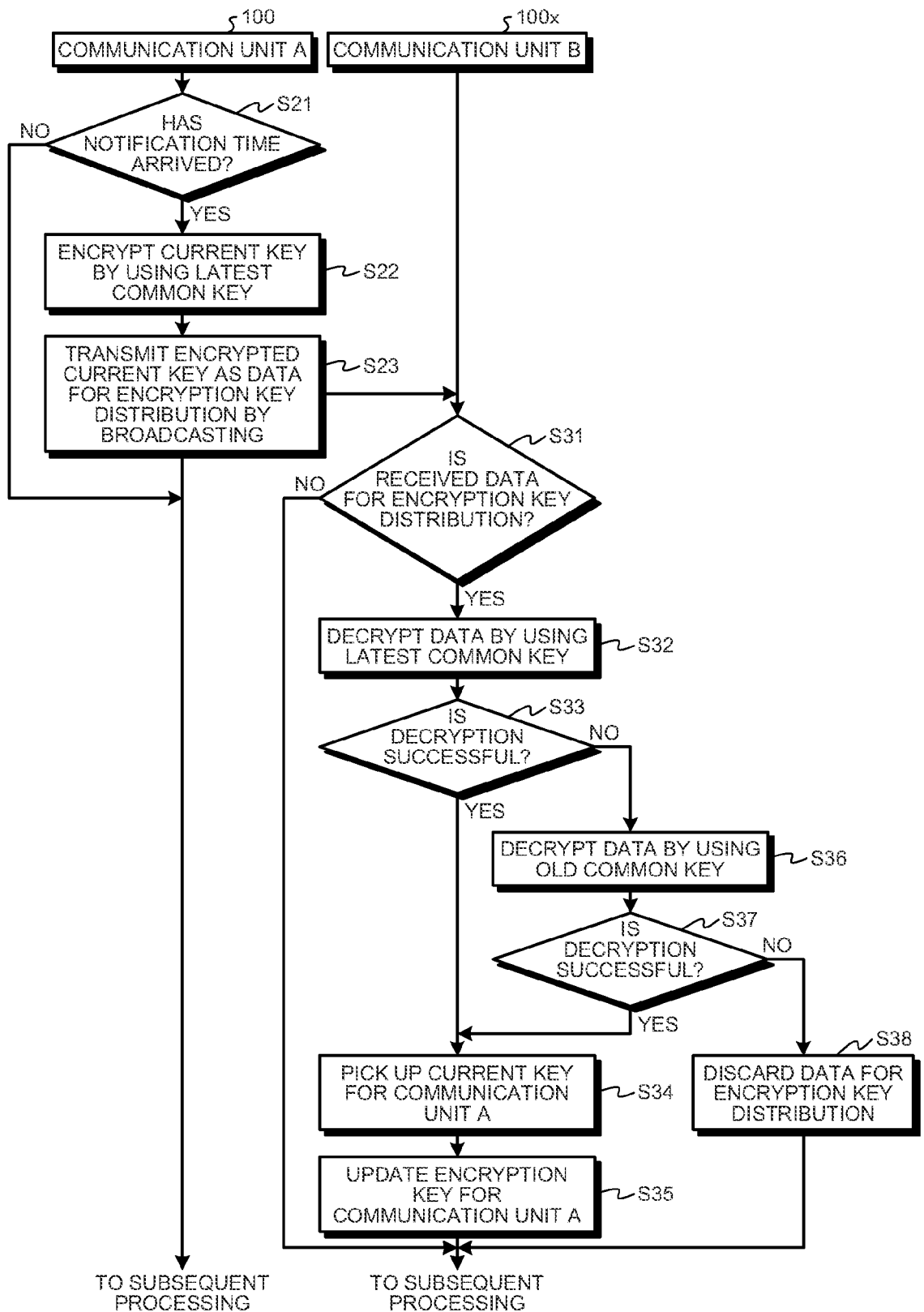
FIG. 5 is a flowchart of current key distribution of the communication apparatus according to the first embodiment of the present invention.
Figure 6:
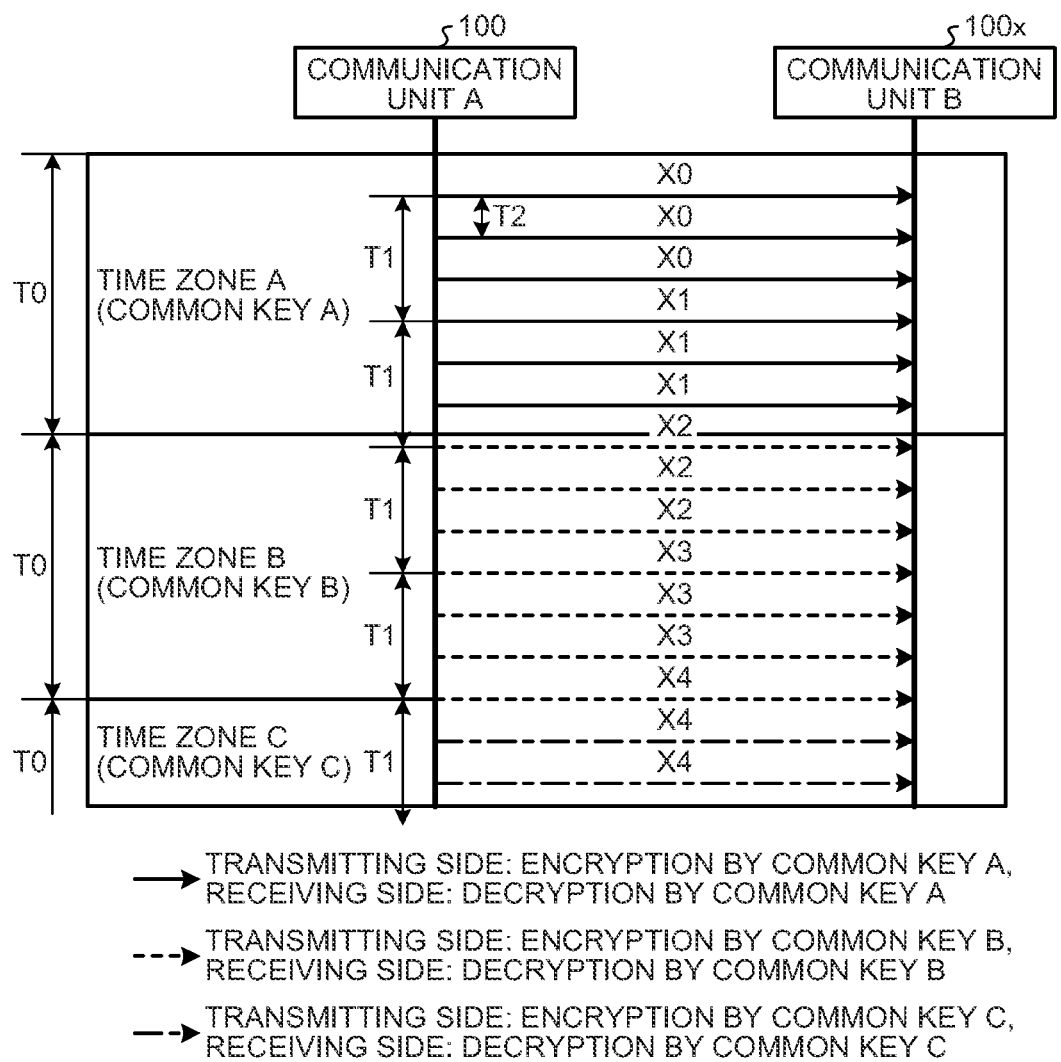
FIG. 6 is a distribution flowchart of a current key of the communication apparatus according to the first embodiment of the present invention.
Figure 7:
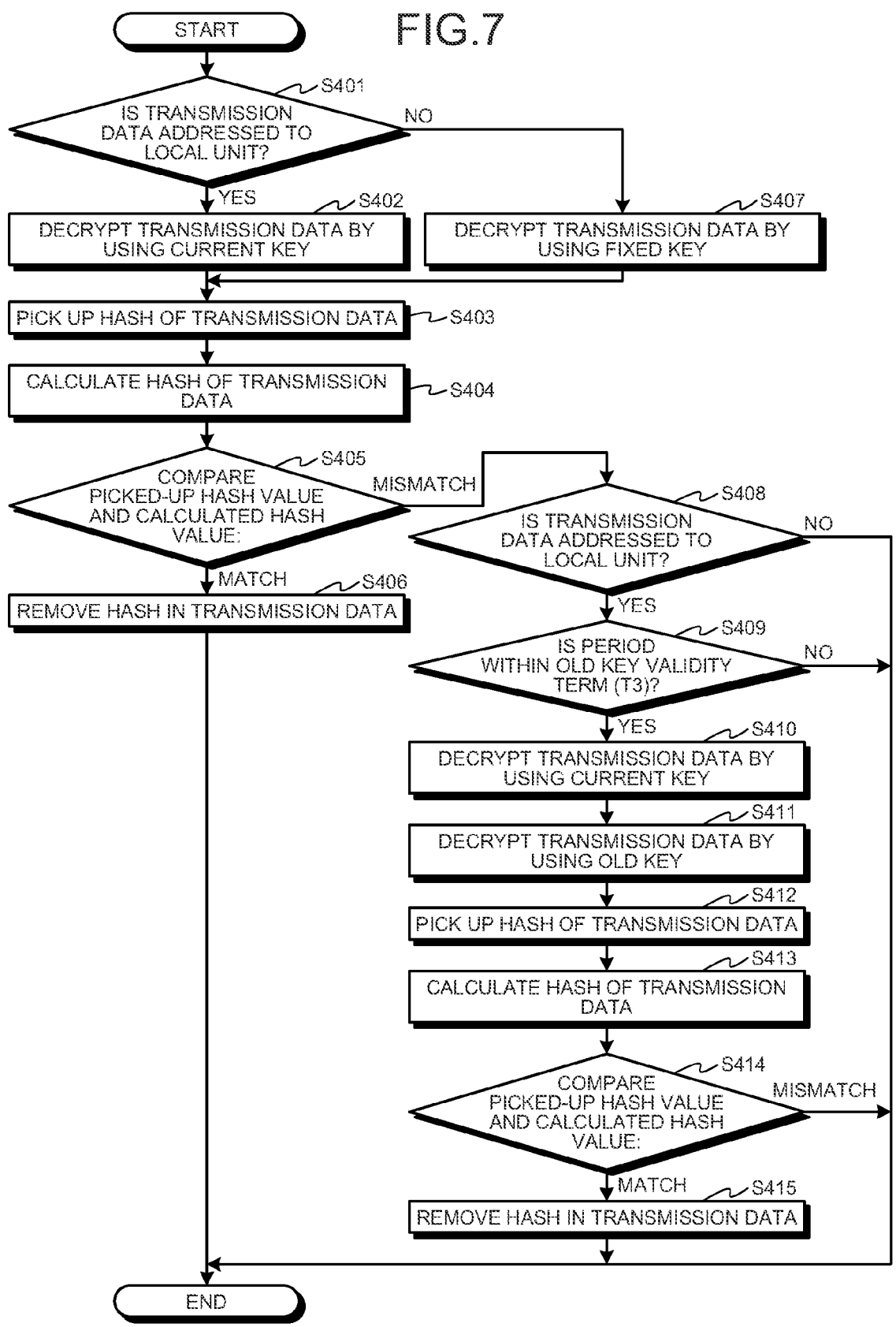
FIG. 7 is a flowchart of reception of transmission data by the communication apparatus according to the first embodiment of the present invention.
Figure 8:
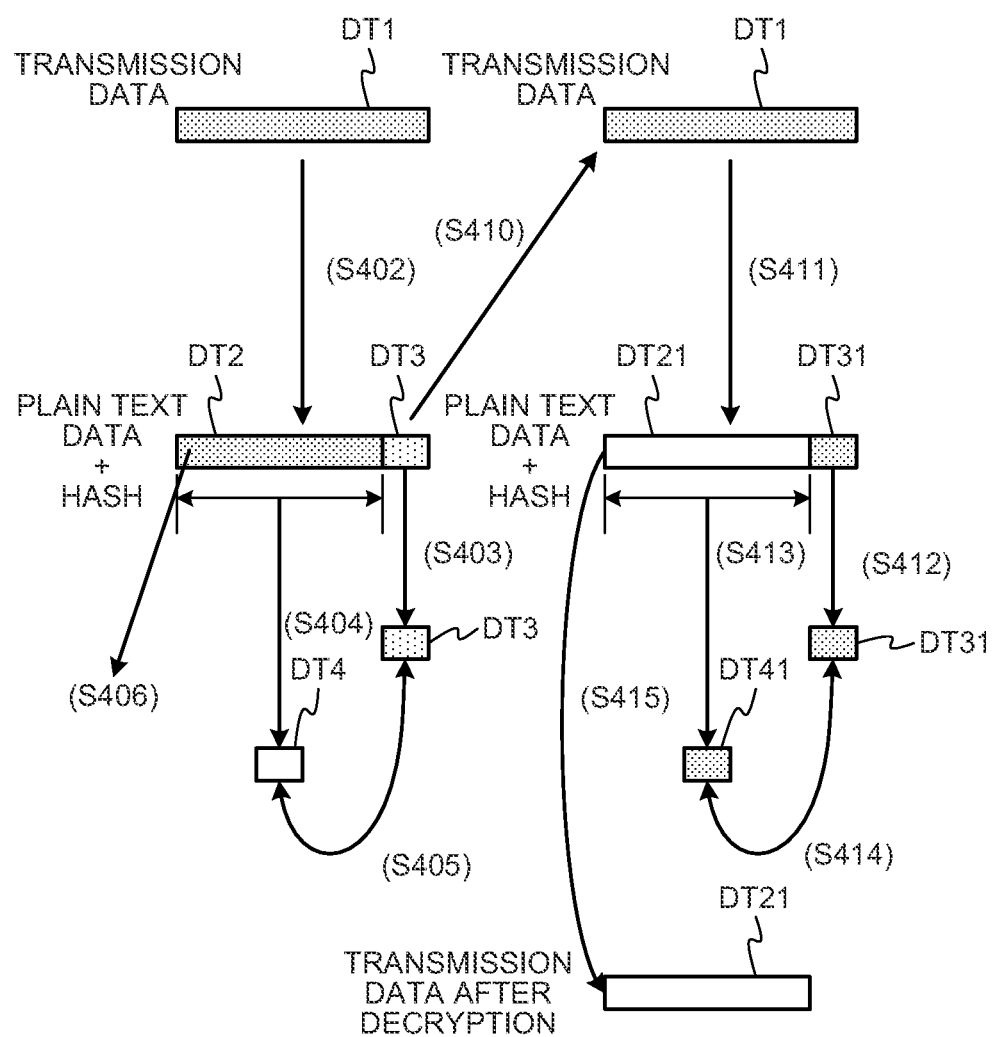
FIG. 8 is an explanatory view of decryption of transmission data by the communication apparatus according to the first embodiment of the present invention.
Figure 9:
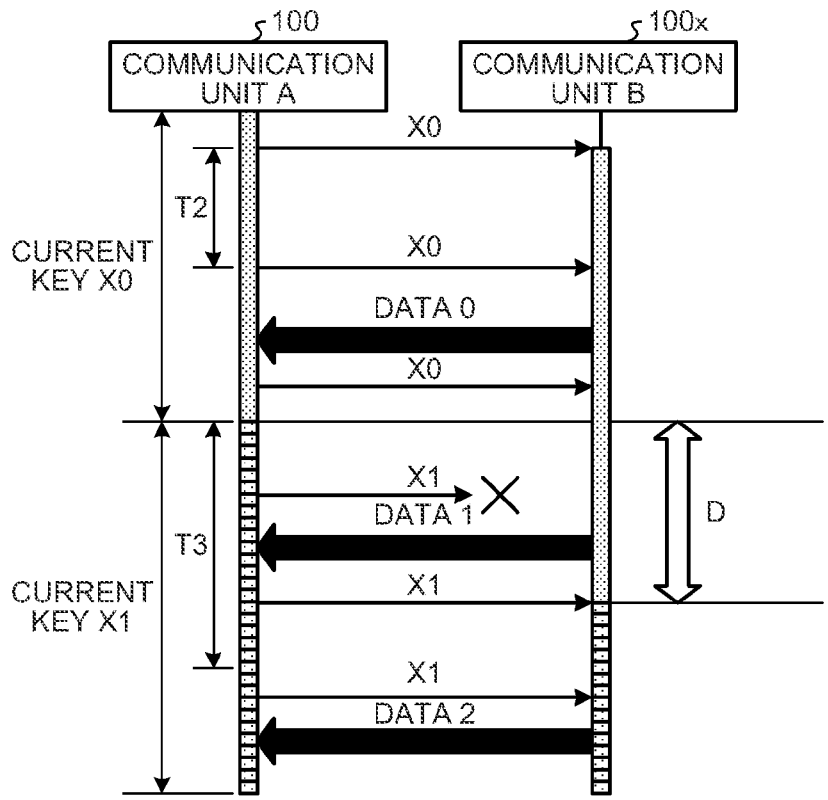
FIG. 9 is a processing flowchart when a time lag of updating the current key of the communication apparatus according to the first embodiment of the present invention occurs.
Figure 10:
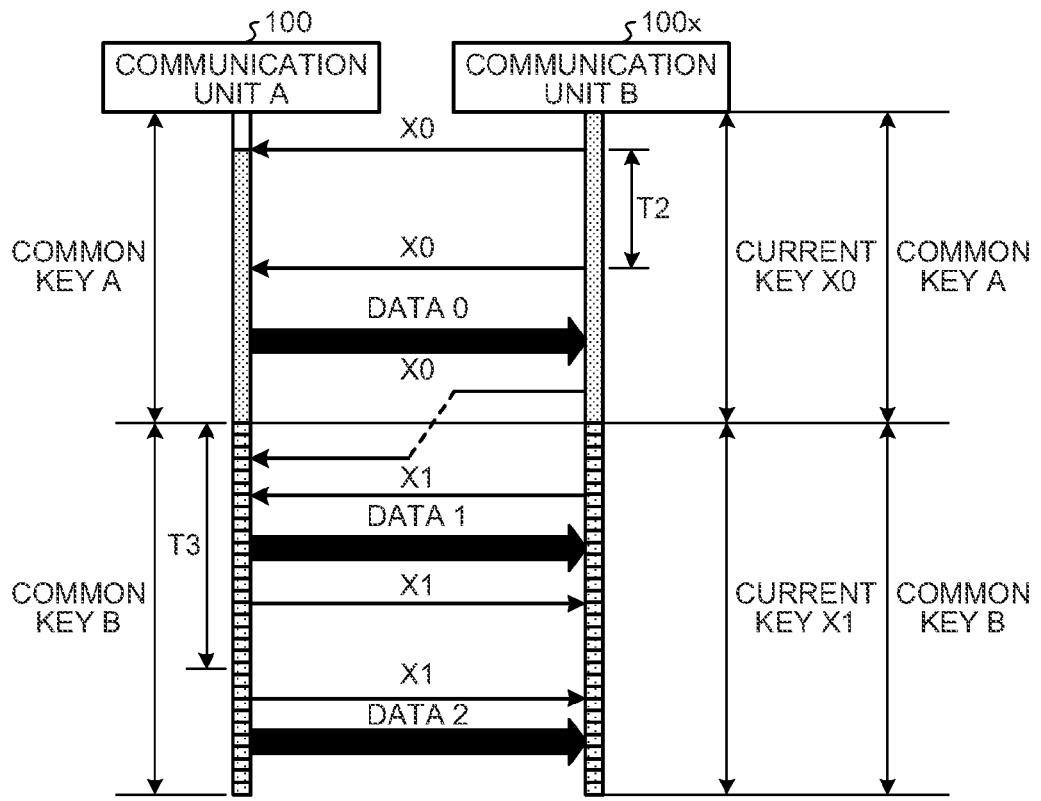
FIG. 10 is a processing flowchart when the time lag of updating a common key of the communication apparatus according to the first embodiment of the present invention occurs.

A communication apparatus according to a first embodiment of the present invention will be described with reference to FIGS. 1 to 10. FIG. 1 is a block diagram illustrating the configuration of a communication apparatus according to the first embodiment of the present invention, FIG. 2 illustrates data layout examples and a data transition example of the communication apparatus illustrated in FIG. 1, FIG. 3 is a network block diagram of the communication apparatus illustrated in FIG. 1, FIGS. 4A and 4B are flowcharts to generate encryption key information and common key information of the communication apparatus illustrated in FIG. 1, FIG. 5 is a flowchart of current key distribution of the communication apparatus illustrated in FIG. 1, FIG. 6 is a distribution flowchart of a current key of the communication apparatus illustrated in FIG. 1, FIG. 7 is a flowchart of reception of transmission data by the communication apparatus illustrated in FIG. 1, FIG. 8 is an explanatory view of decryption of transmission data by the communication apparatus illustrated in FIG. 1, FIG. 9 is a processing flowchart when a time lag of updating the current key of the communication apparatus illustrated in FIG. 1 occurs, and FIG. 10 is a processing flowchart when the time lag of updating a common key of the communication apparatus illustrated in FIG. 1 occurs.

In FIG. 1, a communication unit 100 as a communication apparatus according to the present embodiment includes a data transmitting/receiving unit 1 that transmits/receives data to/from a plurality of other communication units 100$x$ including a function similar to that of the communication unit 100, a plain text data processing unit 2 that edits plain text, an encryption key generation unit 3 that generates encryption key information at constant encryption key generation intervals, an encryption key management unit 31 that holds encryption key information generated by the encryption key generation unit 3 in encryption key information 31$a$ as the latest encryption key information and holds encryption key information one generation before the latest encryption key information in the encryption key information 31$a$ as old encryption key information, a common key generation unit 4 that generates common key information to perform encryption or decryption on encryption key information generated by the encryption key generation unit 3 uniquely with respect to a generation time as the common key information common among communication nodes at common key generation intervals set longer than the encryption key generation intervals, a common key management unit 41 that holds common key information generated by the common key generation unit 4 in common key information 41$a$ as the latest common key information and holds common key information one generation before the latest common key information in the common key information 41$a$ as old common key information, a common key application unit 5 that performs encryption of encryption key information generated by the encryption key generation unit 3 or decryption of encryption key information received from the other communication units 100$x$ using common key information generated by the common key generation unit 4, an encryption key distribution unit 6 that makes a request to the data transmitting/receiving unit 1 to distribute encryption key information encrypted by the common key application unit 5 to all the plurality of communication units 100$x$ to be communicated at encryption key distribution intervals set shorter than the encryption key generation intervals, a decryption unit 7 that decrypts the encrypted data received by the data transmitting/receiving unit 1 into the plain text data by using the latest encryption key information and makes a request to the plain text data processing unit 2 to process the plain text data, a normal decryption determination unit 8 that determines whether the encrypted data received by the data transmitting/receiving unit 1 is successfully decrypted by the decryption unit 7 by using the latest encryption key information within a fixed time from the distribution of the latest encryption key information by the encryption key distribution unit 6, an old key use instruction unit 9 that issues instructions to the decryption unit 7 to decrypt the encrypted data again by using the old encryption key information when the normal decryption determination unit 8 determines that the encrypted data is not successfully decrypted, a remote party key management unit 10 that registers and manages encryption key information of the other communication units 100$x$ in remote party key information 10$a$, an encryption unit 11 that encrypts plain text data corresponding to encrypted data received from the other communication units 100$x$, and a fixed key application unit 12 that encrypts or decrypts data that is not registered in the remote party key information 10$a$ and transmitted/received by using fixed key information broadcast to/from the other communication units 100$x$.

The normal decryption determination unit 8 further determines whether the encryption key information received by the data transmitting/receiving unit 1 is successfully decrypted by the common key application unit 5 by using the latest common key information within a fixed time from the distribution of the latest encryption key information by the encryption key distribution unit 6.

The old key use instruction unit 9 further issues instructions to the common key application unit 5 to decrypt the encryption key information again by using the old common key information when the normal decryption determination unit 8 determines that the encryption key information is not successfully decrypted.

The encryption key information 31$a$ can include, as illustrated in (a) of FIG. 2, an old key item, a current key item, and a next update key item. The old key item indicates an old key, which is the encryption key information used one generation before and prior to the update. The current key item indicates a current key, which is the encryption key information currently being used. The next update key item indicates a next update key, which is the encryption key information to be updated next time.

The common key information 41$a$ can include, as illustrated in (b) of FIG. 2, an old common key item, a current common key item, and a next update common key item. The old key item indicates an old common key, which is the common key information used one generation before and prior to the update. The current common key item indicates a current common key, which is the common key information currently being used. The next update common key item indicates a next update common key, which is the common key information to be updated next time.

The remote party key information 10$a$ can include, as illustrated in (c) of FIG. 2, a remote party number item and a remote party key item. The remote party number item indicates an identification number that identifies the other communication unit 100$x$, which is a remote party of data communication. The remote party key item indicates the encryption key information distributed from the other communication unit 100$x$.

The network configuration in the present embodiment includes, as illustrated in FIG. 3, communication units 100, 100$x$, and 100$y$ that performs radio communication, a server 200 that controls and manages the communication units 100, 100$x$, and 100$y$, and a gateway 300 that performs radio communication with the communication units 100, 100$x$, and 100$y$ and relays intercommunication between the communication units 100, 100$x$, and 100$y$ and the server 200.

The communication unit 100$x$ is intended for steady communication with the communication unit 100 and there is a plurality of communication units 100$x$ to realize intercommunication, so-called ad hoc communication by mutually distributing encryption key information of both periodically. The communication unit 100$y$ is not intended for steady communication with the communication unit 100 and there is a plurality of communication units 100$y$ and though encryption key information is not mutually distributed with the communication unit 100, ad hoc communication is performed with other communication units, for example, between the communication units 100$y$. Thus, the communication units 100, 100$x$, and 100$y$ autonomously construct a radio ad hoc network by multi-hop communication realized by interconnection of radio communication.

An operation of a communication apparatus in the present embodiment based on the above configuration will be described. First, a management operation of the common key information 41$a$ by the common key management unit 41 will be described. A communication unit A as the communication unit 100 determines, as illustrated in FIG. 4A, whether a T0 time has passed since the last update (S1). The T0 time can be set, for example, in units of several hours such as 6 hours and 12 hours.

If the T0 time has passed since the last update based on the determination in S1, the common key generation unit 4 uniquely generates the latest common key as the latest common key information based on the generation time (S2). The common key generation unit 4 can generate the latest common key by using, for example, Greenwich Mean Time (GMT) as the generation time.

Since the latest common key is uniquely decided based on the generation time, the common key generation unit 4 can update the latest common key of the communication units 100, 100$x$, and 100$y$ simultaneously without needing a procedure for distribution. The common key management unit 41 sets the latest common key to the common key information 41$a$ as the next update common key (S2).

After the setting, the common key management unit 41 makes a copy of the current common key set to the common key information 41$a$ as a current common key copy and temporarily stores the copy (S3). After the storage, the common key management unit 41 sets the next update common key set in S2 as the current common key of the common key information 41$a$ (S4).

After the setting, the common key management unit 41 sets the current common key copy as the next update common key of the common key information 41$a$ (S5). After the setting, the common key management unit 41 sets the current common key copy as the old common key of the common key information 41$a$ (S6). If the T0 time has not passed since the last update based on the determination in S1, the common key generation unit 4 does not perform processing in S2 to S6.

Thus, the common key management unit 41 manages the next update common key by associating with the current common key and therefore, the next update common key backs up the current common key so that an irregular state in which the current common key is used while being updated can be avoided with the next update common key.

Next, a management operation of the encryption key information 31$a$ by the encryption key management unit 31 will be described. The communication unit A determines, as illustrated in FIG. 4B, whether a T1 time has passed since the last update (S11). The T1 time can be set, for example, in units of several tens of minutes such as 10 minutes and 20 minutes.

If the T1 time has passed since the last update based on the determination in S11, the encryption key generation unit 3 generates the latest key as the latest encryption key information (S12). The encryption key generation unit 3 generates the latest key that is different each time by using, for example, a random number. The encryption key management unit 31 sets the latest key to the encryption key information 31$a$ as the next update key (S12).

After the setting, the encryption key management unit 31 makes a copy of the current key set to the encryption key information 31$a$ as a current key copy and temporarily stores the copy (S13). After the storage, the encryption key management unit 31 sets the next update key set in S12 as the current key of the encryption key information 31$a$ (S14).

After the setting, the encryption key management unit 31 sets the current key copy as the next update key of the encryption key information 31$a$ (S15). After the setting, the encryption key management unit 31 sets the current key copy as the old key of the encryption key information 31$a$ (S16). If the T1 time has not passed since the last update based on the determination in S11, the encryption key generation unit 3 does not perform processing in S12 to S16.

Thus, the encryption key management unit 31 manages the next update key by associating with the current key and therefore, the next update key backs up the current key so that an irregular state in which the current key is used while being updated can be avoided with the next update key. Regarding the data transition managed by the encryption key management unit 31 when the next update key is generated, as illustrated in (d) of FIG. 2, the next update key makes a transition to the current key and the current key makes a transition to the old key like Pattern 1, Pattern 2, Pattern 3, . . . Regarding management of the common key information 41$a$ by the common key management unit 41, the above data transition occurs as illustrated in (d) of FIG. 2 by replacing the next update key with the next update common key, the current key with the current common key, and the old key with the old common key.

Next, a distribution operation of the current key will be described. The communication unit A transmits, as illustrated in FIG. 5, the current key updated/generated as the encryption key information 31$a$ to a communication unit B, which is one of the communication units 100$x$. For the transmission, the encryption key distribution unit 6 of the communication unit A first determines whether a notification time has been reached based on whether a T2 time has passed after the past notification (S21). The T2 time is set further shorter than the T1 time and can be set, for example, in units of several minutes such as 1 minute and 5 minutes.

The common key application unit 5 encrypts the current key by using the latest common key (S22). The data transmitting/receiving unit 1 transmits the encrypted current key as data for encryption key distribution to the communication units 100$x$ by broadcasting (S23). The operation of the communication unit B that has receiving the transmission by broadcasting will be described below.

The data transmitting/receiving unit 1 of the communication unit B receives data from the communication unit A and determines whether the data is data for encryption key distribution (S31). If the data is data for encryption key distribution based on the determination, the common key application unit 5 decrypts the data for encryption key distribution by using the latest common key (S32).

The normal decryption determination unit 8 determines whether the decryption has been performed successfully (S33). If the decryption is successful based on the determination, the remote party key management unit 10 picks up the current key of the communication unit A from the data for encryption key distribution (S34). The remote party key management unit 10 registers the current key of the communication unit A in the remote party key information 10$a$ (S35).

If the decryption is not successful based on the determination in S33, the old key use instruction unit 9 issues instructions to the common key application unit 5 to decrypt the data for encryption key distribution by using the old common key (S36). The common key application unit 5 decrypts the data for encryption key distribution by using the old common key (S36).

The normal decryption determination unit 8 determines whether the decryption has been performed successfully (S37). If the decryption is successful based on the determination, like in S34, the remote party key management unit 10 picks up the current key of the communication unit A and, like in S35, registers the current key of the communication unit A in the remote party key information 10a. If the decryption is not successful based on the determination in S37, the normal decryption determination unit 8 discards the data for encryption key distribution (S38).

Thus, the communication unit A can periodically distribute, as illustrated in FIG. 6, the updated current key to, for example, the communication unit B, which is one of transmission destinations of broadcasting. In FIG. 6, X0 to X4 illustrate the current key transmitted as the data for encryption key distribution and encrypted by the current common key. Time zones A, B, and C in FIG. 6 illustrate time zones corresponding to common keys A, B, and C as the current common keys updated in accordance with the time.

First, the communication unit A updates/generates the current key X0 in the time zone A and transmits the current key X0 every T2 time by broadcasting. When the T1 time passes after the update of the current key X0, the communication unit A updates/generates the new current key X1 and transmits the current key X1 every T2 time by broadcasting. The communication unit A updates/generates the current keys X2, X3, and X4 every T1 time and repeats similar processing hereinafter.

When the T0 time passes after the occurrence of the time zone A, the current common key is updated with the common key B and the period of the time zone B is entered and thus, the communication unit A transmits the current key by broadcasting after being encrypted by using the common key B. When the T0 time passes after the occurrence of the time zone B, the period of the time zone C is entered and the communication unit A repeats similar processing hereinafter.

Like the communication unit A, the communication unit B can also distribute the current key updated periodically to, for example, the communication unit A, which is one of transmission destinations, by broadcasting. Thus, the communication unit A and the communication unit B can perform bi-directional encryption communication by mutually distributing and updating the current keys periodically.

Next, when the communication unit 100 receives transmission data from the other communication unit 100x, the communication unit 100 decrypts the transmission data by using the current key distributed to the other communication unit 100x. Regarding the decryption, as illustrated in FIG. 7, the data transmitting/receiving unit 1 of the communication unit 100 first determines whether the transmission data is addressed to the local unit (S401).

If the transmission data is data addressed to the local unit based on the determination, the decryption unit 7 decrypts the transmission data based on the encryption key information 31a by using the current key (S402). The decryption unit 7 acquires, as illustrated in FIG. 8, plain text data DT2 and hash DT3 from transmission data DT1, which is the transmission data, by the decryption in S402.

The normal decryption determination unit 8 acquires, as illustrated in FIGS. 7 and 8, the hash DT3 contained in the decrypted transmission data (S403). The normal decryption determination unit 8 also calculates hash DT4 based on the plain text data DT2 (S404). The normal decryption determination unit 8 compares and determines whether the hash DT3 and the hash DT4 match (S405).

If the hash DT3 and the hash DT4 match based on the comparison and determination in S405, the decryption unit 7 outputs the plain text data DT2 obtained by removing the hash DT3 from the transmission data DT1 to the plain text data processing unit 2 (S406). The plain text data processing unit 2 accepts the plain text data DT2 to perform subsequent data processing.

Thus, the normal decryption determination unit 8 determines whether decryption by the decryption unit 7 is successful by using a hash calculation and therefore, the result of the decryption can be verified accurately at high speed and, as a result, processing loads on the verification can be suppressed.

If the transmission data received in S401 is not addressed to the local unit based on the determination, as illustrated in FIG. 7, the fixed key application unit 12 decrypts the transmission data by using a fixed key as the fixed key information (S407).

If the hash DT3 and the hash DT4 do not match in S405, the decryption unit 7 determines whether the transmission data is addressed to the local unit (S408). If the transmission data is data addressed to the local unit based on the determination, the encryption key distribution unit 6 determines whether the old key is valid based on whether an old key validity term T3 indicating the term of validity after the distribution of the current key is valid (S409). The old key validity term T3 arises after the update of the current key and can be set, for example, in units of several minutes.

As illustrated in FIGS. 7 and 8, the decryption unit 7 restores the transmission data decrypted into the plain text data DT2 and the hash DT3 to the transmission data DT1 before the decryption, that is, performs the encryption (S410). The decryption unit 7 decrypts the restored transmission data DT1 again based on the encryption key information 31a by using the old key (S411). The decryption unit 7 acquires plain text data DT21 and hash DT31 from transmission data DT1 by the decryption in S411.

The normal decryption determination unit 8 acquires, as illustrated in FIGS. 7 and 8, the hash DT31 contained in the decrypted transmission data (S412). The normal decryption determination unit 8 also calculates hash DT41 based on the plain text data DT21 (S413). The normal decryption determination unit 8 compares and determines whether the hash DT31 and the hash DT41 match (S414).

If the hash DT31 and the hash DT41 match based on the comparison and determination in S414, the decryption unit 7 outputs the plain text data DT21 obtained by removing the hash DT31 from the transmission data DT1 to the plain text data processing unit 2 (S415). Then, the plain text data processing unit 2 accepts the plain text data DT21 to perform subsequent data processing.

A case when the communication unit A distributes, as illustrated in FIG. 9, the current key X0, X1, . . . to the communication unit B every T2 time will be described by assuming that synchronization of the current common key is maintained. If, for example, transmission data DATA1 encrypted by using the current key X0 one generation before is received due to a failure of the first distribution of the current key X1 for some reason, the communication unit A can successfully decrypt the transmission data DATA1 by using the current key X0 if in the period of T3. The communication unit A can normally perform data communication even in a period D in which a shift of the current key arises before the communication unit B successfully receives the current key X1.

Thus, even if encrypted data encrypted by using an old current key before the update is received from another communication node depending on update timing based on transmitting/receiving of the current key, the decryption unit 7 can decrypt the encrypted data by using the old key held in the encryption key information 31a without discarding the encrypted data so that data reachability can be improved by avoiding an interruption of communication due to a mismatch of encryption key information.

The decryption unit 7 performs the encryption to restore the transmission data DT1 before the decryption in S410, but by including, for example, a buffer area to store the transmission data DT1, the encryption can be replaced by temporarily saving and holding the transmission data DT1 in the buffer area before the decryption.

If the remote party key management unit 10 receives the current key of the other communication unit 100x from the other communication unit 100x, the remote party key management unit 10 decrypts the current key by using the current common key and registers the decrypted current key in the remote party key information 10a as the remote party key for each of the communication units 100x. Regarding reception of the current key, the communication unit 100 performs processing similar to the processing in FIG. 7 according to a sequence obtained by removing the determination whether addressed to the local unit in S401 and S408 after replacing the current key with the current common key, the old key with the old common key, and the transmission data with the distributed current key in FIG. 7.

A case when the communication unit A receives the current key X0, X1, . . . distributed, as illustrated in FIG. 10, from the communication unit B every T2 time will be described. Even if, for example, the current key X0 encrypted by using a common key A one generation before is received due to the delay of the last distribution of the current key X0, the communication unit A can successfully decrypt the current key X0 by using the common key A if in the period of T3.

Thanks to the decryption, the communication unit A can normally perform data communication without causing a period in which a shift of the current key with the communication unit B occurs like the period D even if a delay arises. Therefore, even if a current key encrypted by using an old common key before the update is received from another communication node for some reason, the decryption unit 7 can decrypt the current key by using the old common key without discarding the current key so that data reachability can further be improved by avoiding an interruption of communication due to a mismatch of the current keys.

It is necessary for the fixed key application unit 12 to broadcast data to communication parties including the communication units 100y that are excluded from steady communication with the communication unit 100 and to which the current key is not mutually distributed, the fixed key application unit 12 can use the fixed key for broadcasting. The fixed key can be included in the communication units 100, 100x, and 100y in common without being updated. The hardware configuration of the communication unit 100 according to the present embodiment includes a CPU, memory, a storage apparatus, a radio communication apparatus, and a bus that connected each of the above units.

[b] Other Embodiments

As another embodiment of the present embodiment, while the encryption key information 31a stores and manages two encryption keys of a current key and an old key in the first embodiment, a plurality of encryption keys up to one generation before may be stored as the old keys. In this case, the old key use instruction unit 9 can select one suitable encryption key from the plurality of old keys and transmission data can successfully be processed particularly when the transmission data encrypted by using a current key prior to one generation before is received due to a communication delay so that communication reachability can further be improved. A communication unit in each of the above embodiments can widely be applied to any network constructed by radio ad hoc communication without being limited by uses.

According to an embodiment, an encryption key generation unit generates encryption key information at constant encryption key generation intervals, a common key generation unit generates common key information uniquely with respect to a generation time at common key generation intervals set longer than the encryption key generation intervals, a common key application unit performs encryption or decryption of the encryption key information by using the common key information, and a encryption key distribution unit makes a request to a data transmitting/receiving unit to distribute the encryption key information to all the plurality of communication nodes to be communicated at encryption key distribution intervals set shorter than the encryption key generation intervals and therefore, not only the encryption key information, but also the common key information is updated periodically so that communication can be performed with higher security.

According to the embodiment, an encryption key management unit holds the encryption key information generated by the encryption key generation unit as latest encryption key information and holds the encryption key information at least one generation before the latest encryption key information as old encryption key information, decryption unit decrypts received encrypted data into plain text data by using the latest encryption key information and makes a request to a plain text data processing unit to process the plain text data, a normal decryption determination unit determines whether the received encrypted data is successfully decrypted by using the latest encryption key information within a fixed time from distribution of the latest encryption key information by the encryption key distribution unit, and if the encrypted data is not successfully decrypted, an old key use instruction unit issues instructions to the decryption unit to decrypt the encrypted data again by using the old encryption key information and therefore, even if encrypted data encrypted by using old encryption key information before the update is received from another communication node depending on update timing of the encryption key information, the encrypted data can be decrypted by using the old encryption key information without discarding the encrypted data so that data reachability can be improved by avoiding an interruption of communication due to a mismatch of encryption key information.

According to the embodiment, a common key management unit holds the common key information as latest common key information and holds the common key information at least one generation before the latest common key information as old common key information, the normal decryption determination unit further determines whether the encryption key information received by the data transmitting/receiving unit is successfully decrypted by using the latest common key information within the fixed time from the distribution of the latest encryption key information, and if the encryption key information is not successfully decrypted, the old key use instruction unit further issues instructions to the common key application unit to decrypt the encryption key information again by using the old common key information and therefore, even if encryption key information encrypted by using old common key information before the update is received from another communication node depending on update timing of the common key information, the encryption key information can be decrypted by using the old common key information without discarding the encryption key information so that data reachability can further be improved by avoiding an interruption of communication due to a mismatch of encryption key information.

According to the embodiment, the normal decryption determination unit uses a hash calculation to determine whether the plain text data is successfully decrypted by using the latest encryption key information and therefore, the result of the decryption using the latest encryption key information can be verified accurately at high speed so that processing loads on the verification of result can be suppressed.

According to the embodiment, the normal decryption determination unit uses a hash calculation to determine whether the plain text data is successfully decrypted by using the latest common key information and therefore, the result of the decryption using the latest common key information can be verified accurately at high speed so that processing loads on the verification of result can be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus, comprising:
    a data transmitting/receiving unit that transmits data to and receives data from another communication apparatus;
    a plain text data processing unit that edits plain text data;
    an encryption key generation unit that generates encryption key information at constant encryption key generation intervals;
    a common key generation unit that generates common key information uniquely with respect to a generation time as the common key information common among communication apparatuses at common key generation intervals set longer than the encryption key generation intervals;
    a common key application unit that performs encryption of the encryption key information generated by the encryption key generation unit or decryption of encryption key information received from another communication apparatus using the common key information generated by the common key generation unit, the encryption key information received from the another communication apparatus being encrypted by common key information generated therein; and
    an encryption key distribution unit that makes a request to the data transmitting/receiving unit to distribute the encryption key information encrypted by the common key application unit to all communication apparatuses to be communicated at encryption key distribution intervals set shorter than the encryption key generation intervals.

2. The communication apparatus according to claim 1, further comprising:
    an encryption key management unit that holds the encryption key information generated by the encryption key generation unit as latest encryption key information and holds the encryption key information at least one generation before the latest encryption key information as old encryption key information;
    a decryption unit that decrypts encrypted data received by the data transmitting/receiving unit into the plain text data by using the latest encryption key information and makes a request to the plain text data processing unit to process the plain text data;
    a normal decryption determination unit that determines whether the encrypted data received by the data transmitting/receiving unit is successfully decrypted by the decryption unit by using the latest encryption key information within a fixed time from distribution of the latest encryption key information by the encryption key distribution unit; and
    an old key use instruction unit that issues instructions to the decryption unit to decrypt the encrypted data again by using the old encryption key information when the normal decryption determination unit determines that the encrypted data is not successfully decrypted.

3. The communication apparatus according to claim 2, further comprising:
    a common key management unit that holds the common key information generated by the common key generation unit as latest common key information and holds the common key information at least one generation before the latest common key information as old common key information;
    a normal decryption determination unit that further determines whether the encryption key information received by the data transmitting/receiving unit is successfully decrypted by the common key application unit by using the latest common key information within the fixed time from the distribution of the latest encryption key information by the encryption key distribution unit; and
    an old key use instruction unit that further issues instructions to the common key application unit to decrypt the encryption key information again by using the old common key information when the normal decryption determination unit determines that the encryption key information is not successfully decrypted.

4. The communication apparatus according to claim 2, wherein
    the encrypted data received by the data transmitting/receiving unit contains a hash value, and
    the normal decryption determination unit makes a hash calculation for the plain text data decrypted by the decryption unit and determines whether a result of the hash calculation and the hash value match to determine whether the plain text data is successfully decrypted by the decryption unit by using the latest encryption key information.

5. The communication apparatus according to claim 3, wherein
    the encryption key information received by the data transmitting/receiving unit contains a hash value, and
    the normal decryption determination unit makes a hash calculation for the encryption key information decrypted by the common key application unit and determines whether a result of the hash calculation and the hash value match to determine whether the encryption key information is successfully decrypted by the common key application unit by using the latest common key information.

6. A communication method performed in a communication apparatus, comprising:
   transmitting data to and receiving data from another communication apparatus;
   editing plain text data;
   generating encryption key information at constant encryption key generation intervals;
   generating common key information uniquely with respect to a generation time as the common key information common among communication apparatuses at common key generation intervals set longer than the encryption key generation intervals;
   performing encryption of the generated encryption key information or decryption of encryption key information received from another communication apparatus using the generated common key information, the encryption key information received from the another communication apparatus being encrypted by common key information generated therein; and
   distributing the encrypted encryption key information to all communication apparatuses to be communicated at encryption key distribution intervals set shorter than the encryption key generation intervals.

7. The communication method according to claim 6, further comprising:
   holding the generated encryption key information as latest encryption key information;
   holding the encryption key information at least one generation before the latest encryption key information as old encryption key information;
   decrypting encrypted data received at the receiving into the plain text data by using the latest encryption key information;
   processing the plain text data;
   determining whether the received encrypted data is successfully decrypted by using the latest encryption key information within a fixed time from distribution of the latest encryption key information; and
   decrypting the encrypted data again by using the old encryption key information when it is determined that the encrypted data is not successfully decrypted.

8. The communication method according to claim 7, further comprising:
   holding the generated common key information as latest common key information;
   holding the common key information at least one generation before the latest common key information as old common key information;
   determining whether the encryption key information received at the receiving is successfully decrypted by using the latest common key information within the fixed time from the distribution of the latest encryption key information; and
   decrypting the encryption key information again by using the old common key information when it is determined that the encryption key information is not successfully decrypted.

9. The communication method according to claim 7, wherein
   the received encrypted data contains a hash value, and
   the determining includes
      making a hash calculation for the decrypted plain text data, and
      determining whether a result of the hash calculation and the hash value match to determine whether the plain text data is successfully decrypted by using the latest encryption key information.

10. The communication method according to claim 8, wherein
   the received encryption key information contains a hash value, and
   the determining includes
      making a hash calculation for the decrypted encryption key information, and
      determining whether a result of the hash calculation and the hash value match to determine whether the encryption key information is successfully decrypted by using the latest common key information.

11. A non-transitory computer-readable recording medium storing a communication program for causing a computer to execute a process comprising:
   transmitting data to and receiving data from another communication apparatus;
   editing plain text data;
   generating encryption key information at constant encryption key generation intervals;
   generating common key information uniquely with respect to a generation time as the common key information common among communication apparatuses at common key generation intervals set longer than the encryption key generation intervals;
   performing encryption of the generated encryption key information or decryption of encryption key information received from another communication apparatus using the generated common key information, the encryption key information received from the another communication apparatus being encrypted by common key information generated therein; and
   distributing the encrypted encryption key information to all communication apparatuses to be communicated at encryption key distribution intervals set shorter than the encryption key generation intervals.

12. The non-transitory computer-readable recording medium according to claim 11, wherein the process further comprises:
   holding the generated encryption key information as latest encryption key information;
   holding the encryption key information at least one generation before the latest encryption key information as old encryption key information;
   decrypting encrypted data received at the receiving into the plain text data by using the latest encryption key information;
   processing the plain text data;
   determining whether the received encrypted data is successfully decrypted by using the latest encryption key information within a fixed time from distribution of the latest encryption key information; and
   decrypting the encrypted data again by using the old encryption key information when it is determined that the encrypted data is not successfully decrypted.

13. The non-transitory computer-readable recording medium according to claim 12, wherein the process further comprises:
   holding the generated common key information as latest common key information;
   holding the common key information at least one generation before the latest common key information as old common key information;

determining whether the encryption key information received at the receiving is successfully decrypted by using the latest common key information within the fixed time from the distribution of the latest encryption key information; and decrypting the encryption key information again by using the old common key information when it is determined that the encryption key information is not successfully decrypted.

14. The non-transitory computer-readable recording medium according to claim 12, wherein the received encrypted data contains a hash value, and the determining includes making a hash calculation for the decrypted plain text data, and determining whether a result of the hash calculation and the hash value match to determine whether the plain text data is successfully decrypted by using the latest encryption key information.

15. The non-transitory computer-readable recording medium according to claim 13, wherein the received encryption key information contains a hash value, and the determining includes making a hash calculation for the decrypted encryption key information, and determining whether a result of the hash calculation and the hash value match to determine whether the encryption key information is successfully decrypted by using the latest common key information.

* * * * *